United States Patent
Djordjevic

(10) Patent No.: US 10,015,690 B2
(45) Date of Patent: Jul. 3, 2018

(54) TECHNIQUE FOR CALL PROCESSING AND ANALYSIS

(71) Applicant: Telefonaktiebolaget LM Ericsson (publ), Stockholm (SE)

(72) Inventor: Branko Djordjevic, Herzogenrath (DE)

(73) Assignee: Telefonaktiebolaget LM Ericson (publ), Stockhokm (SE)

( * ) Notice: Subject to any disclaimer, the term of this patent is extended or adjusted under 35 U.S.C. 154(b) by 133 days.

(21) Appl. No.: 15/121,601

(22) PCT Filed: Feb. 28, 2014

(86) PCT No.: PCT/EP2014/053937
§ 371 (c)(1),
(2) Date: Aug. 25, 2016

(87) PCT Pub. No.: WO2015/127984
PCT Pub. Date: Sep. 3, 2015

(65) Prior Publication Data
US 2016/0373949 A1     Dec. 22, 2016

(51) Int. Cl.
*H04M 3/22*     (2006.01)
*H04W 8/10*     (2009.01)
(Continued)

(52) U.S. Cl.
CPC ......... *H04W 24/08* (2013.01); *H04M 3/2281* (2013.01); *H04W 8/10* (2013.01);
(Continued)

(58) Field of Classification Search
CPC ....... H04W 24/08; H04W 8/10; H04W 12/02; H04M 3/2281; H04M 2207/18;
(Continued)

(56) References Cited

U.S. PATENT DOCUMENTS 9,160,799 B2 * 10/2015 Toshniwal .......... H04L 65/1016
9,338,631 B2 * 5/2016 Anulf .................. H04L 12/1467
(Continued)

FOREIGN PATENT DOCUMENTS

WO     WO 02/082729 A1     10/2002
WO     WO 2012/092988 A1     7/2012

OTHER PUBLICATIONS

International Search Report and Written Opinion of the International Searching Authority, Application No. PCT/EP2014/053937, dated Oct. 23, 2014.
(Continued)

*Primary Examiner* — Khawar Iqbal
(74) *Attorney, Agent, or Firm* — Sage Patent Group

(57) ABSTRACT

A technique in a telecommunications core network of processing a call between at least a first subscriber terminal and a second subscriber terminal. Verifying that the call is eligible for call analysis by checking the settings of call monitoring consent. Then, a first node on a call control plane of the core network is triggered to provide subscriber data to a call analysis node. The subscriber data includes at least one subscriber identifier. A second node on a user plane of the core network is triggered to direct at least a part of media data included in the call to the call analysis node. Related operations for legal interception and monitoring of a call and for separation of user plane and call control plane are provided.

21 Claims, 6 Drawing Sheets

(51) Int. Cl.
*H04W 12/02* (2009.01)
*H04W 24/08* (2009.01)

(52) U.S. Cl.
CPC .......... *H04W 12/02* (2013.01); *H04M 3/2227* (2013.01); *H04M 2207/18* (2013.01)

(58) Field of Classification Search
CPC ..... H04M 3/22; H04M 3/2227; H04L 65/103; H04L 65/1023
See application file for complete search history.

(56) References Cited

U.S. PATENT DOCUMENTS

| | | | | |
|---|---|---|---|---|
| 2009/0190479 | A1* | 7/2009 | Parsons | H04L 12/14 370/241 |
| 2011/0075675 | A1* | 3/2011 | Koodli | H04L 12/14 370/401 |
| 2012/0135740 | A1* | 5/2012 | Hellwig | H04W 72/0433 455/445 |
| 2012/0282896 | A1* | 11/2012 | Toh | H04W 8/26 455/410 |
| 2012/0282903 | A1* | 11/2012 | Rabra | H04M 3/42272 455/414.1 |
| 2012/0327798 | A1* | 12/2012 | Pelkonen | H04L 65/1043 370/252 |
| 2013/0226543 | A1* | 8/2013 | Ramachandran | H04W 4/02 703/2 |
| 2014/0101305 | A1* | 4/2014 | Kelley, Jr. | H04L 45/24 709/224 |
| 2015/0271731 | A1* | 9/2015 | Backhaus | H04L 65/1069 455/445 |
| 2016/0277566 | A1* | 9/2016 | Milstein | H04W 4/16 |
| 2017/0085710 | A1* | 3/2017 | Wyss | G09B 19/00 |

OTHER PUBLICATIONS

Hill, "How to Opt Out of AT&T's Plan to Sell Everything It Knows About You and Your Smartphone Use", Jul. 3, 2013, downloaded Jan. 13, 2014 from http://www.forbes.com/sites/kashmirhill/2013/07/03/how-to-opt-out-of-atts-plan-to-sell-everything-it-knows-about-you-and-your-smartphone-use/#142e4f696ee8, 5 pp.

Leber, "How Wireless Carriers Are Monetizing Your Movements", Apr. 12, 2013, downloaded Jan. 13, 2014 from https://www.technologyreview.com/s/513016/how-wireless-carriers-are-monetizing-your-movements/, 9 pp.

* cited by examiner

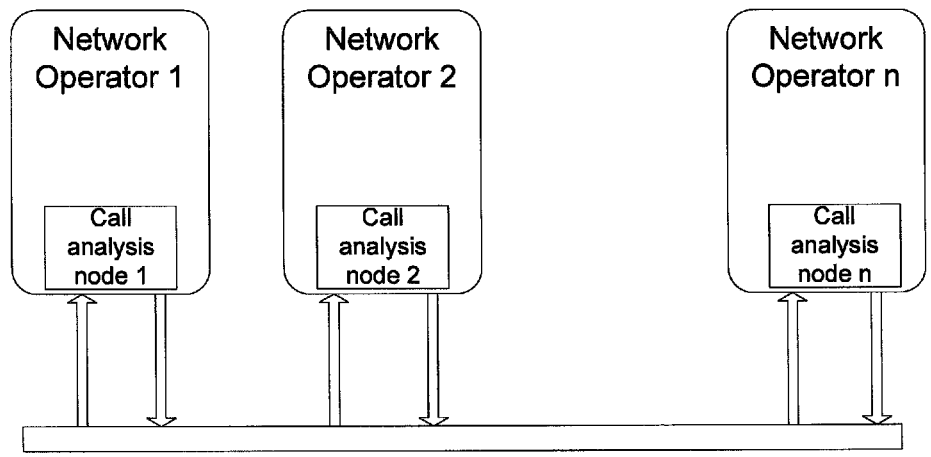
Fig. 5
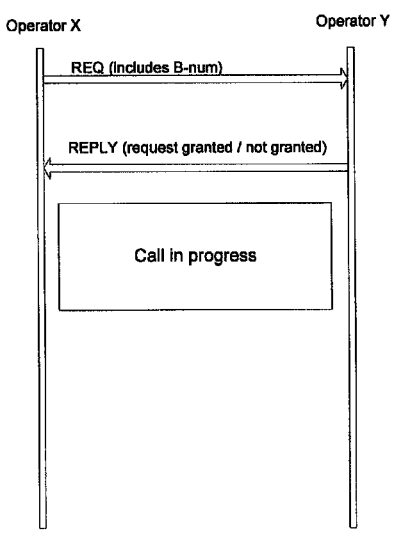
Fig. 6
Fig. 7

TECHNIQUE FOR CALL PROCESSING AND ANALYSIS

CROSS REFERENCE TO RELATED APPLICATION

This application is a 35 U.S.C. § 371 national stage application of PCT International Application No. PCT/EP2014/053937, filed on Feb. 28, 2014, the disclosure and content of which is incorporated by reference herein in its entirety. The above-referenced PCT International Application was published in the English language as International Publication No. WO 2015/127984 A1 on Sep. 3, 2015.

TECHNICAL FIELD

The present disclosure generally relates to a technique for processing and analyzing a call in a telecommunications network. The technique may be implemented in the form of methods, devices, nodes and computer programs.

BACKGROUND

Call analysis is an important feature of modern telecommunications networks. There exist various motives for call analysis. As an example, network operators may want to ensure that the calls within their networks meet certain Quality of Service, QoS, standards. Also, lawful interception has increasingly gained importance from the perspective of national security agencies. Last not least, there is an interest in analyzing calls for commercial purposes.

Call analysis can be performed at various places within a telecommunications network. Typically, the information that needs to be gathered also determines the place where the call analysis framework is implemented. However, also other constraints such as privacy concerns need to be considered when installing the call analysis framework. From a privacy perspective, it would be desirable to decouple call analysis from call processing in the telecommunications core network. Such a decoupling is particularly desirable for security reasons in case the call analysis results will need to be provided to parties external to the network operator domain.

In one variant, the call analysis framework may be installed on a separate call analysis node inside or outside the telecommunications core network. Such a deployment is advantageous from various perspectives. For example, the operational nodes of the core network are not burdened with any call analysis processing. Moreover, external parties can be provided with access to the call analysis node without security concerns for the core network. Importantly, also privacy-related regulations can more easily be implemented as the call analysis node may ensure that call-related data are aggregated anonymously.

SUMMARY

There is a need for a call processing and analysis technique that can securely be implemented in relation to a telecommunications core network.

According to a first aspect, a method of processing in a telecommunications core network a call between a first subscriber terminal and a second subscriber terminal is provided, wherein the call includes media data. The method comprises verifying that the call is eligible for call analysis. The method further comprises triggering a first node on a call control plane of the core network to provide subscriber data to a call analysis node. The subscriber data includes at least one subscriber identifier for at least one of the first subscriber terminal and the second subscriber terminal. The method further comprises triggering a second node on a user plane of the core network to direct at least a part of the media data to the call analysis node.

The call may be a circuit-switched call or a packet-switched call. The media data may comprise audio data (e.g., in the case of a voice call), picture or video data (e.g., in the case of a media call), or a combination thereof (e.g., in the case of an Over The Top, OTT, call via Skype™ or a similar service).

According to one variant, the call analysis node is located in the core network. In another variant, the call analysis node is located outside the core network. The call analysis node may be implemented in the form of a dedicated hardware component or in the form of a virtualized hardware component within a computing cloud.

The step of verifying that the call is eligible for call analysis may comprise determining that at least one of the first subscriber terminal and the second subscriber terminal is associated with a call analysis consent setting. The call analysis consent setting may take the form of a flag or any other identifier indicative of an individual subscriber's consent to call analysis.

Call analysis consent setting information for at least one of the first subscriber terminal and the second subscriber terminal may be received from an Operator or Business Support System, O/BSS, or any other data source. The call analysis consent setting information may be indicative of whether or not a call analysis consent has been given by a subscriber. The received call analysis consent setting information may be stored at a dedicated network node within the core network, such as a Home Location Register, HLR, or (Centralized) User Database, UDB. The UDB may generally be a database that provides a single point of access and administration to the subscriber data within a core network.

The call analysis consent setting information may be received on a call-by-call basis or otherwise (e.g., batch-wise for a large number of subscribers). In one variant, the core network specifically requests the call analysis consent setting information for an individual call (e.g., at call setup) from the O/BSS or another data source.

According to one implementation, it may be determined that at least one of the first subscriber terminal and the second subscriber terminal is roaming in or visiting the core network. In such a situation, the method may further comprise requesting call analysis consent setting information for the roaming or visiting subscriber terminal(s) from at least one of the call analysis node and a home network of the roaming or visiting subscriber terminal(s). In one variant, the call analysis consent setting information is requested from the call analysis node, which in turn contacts the home network (e.g., another call analysis node within the home network) for the required call analysis consent setting information.

The method may further comprise determining that one of the first subscriber terminal and the second subscriber terminal is not associated with a call analysis consent setting (e.g., because no consent to call analysis has been given). In such a case, media data originating from the respective subscriber terminal is excluded from being directed to the call analysis node. Alternatively, the call analysis node may be informed that media data originating from the respective subscriber terminal is to be excluded from media analysis.

As explained above, the subscriber data provided on the call control plane to the call analysis node may include various items of information, including the subscriber identifier of the first subscriber terminal and/or the second subscriber terminal. The subscriber identifier may take the form of an Integrated Services Digital Network, MSISDN, number, a Mobile Station ISDN, MSISDN, number, an International Mobile Subscriber Identity, IMSI, and an Internet Protocol, IP, address. The IP address may be determined using Deep Packet Inspection, DPI, at the core network or elsewhere.

The method may further comprise receiving from the call analysis node a request for location data of at least one of the first subscriber terminal and the second subscriber terminal. In response to such a request, provision of the requested location data to the call analysis may be triggered. As an example, the first or a second node on the call control plane may be instructed to provide the requested location data to the call analysis node.

The first node may be one of an HLR node, a UDB node and a Serving Mobile Location Centre, SMLC, node. The second node may be any gateway node, such as Media Gateway, MGW, node, or such as a packet gateway (e.g., an Evolved Packet Gateway, EPG). In one variant, the method is fully or at least partially performed by one of a Mobile Switching Centre, MSC, a Call Session Control Function, CSCF, a Transit Switching Centre, TSC, a wireline telecommunications exchange or a any other control node.

Also provided is a method of operating a call analysis node for analysing a call between at least a first subscriber terminal and a second subscriber terminal, wherein the call includes media data. The method comprises receiving, on a call control plane, subscriber data, wherein the subscriber data includes at least one subscriber identifier for at least one of the first subscriber terminal and the second subscriber terminal. The method further comprises requesting, based on the at least one subscriber identifier, further subscriber data and receiving the further subscriber data. The method also comprises receiving, on a user plane, at least a part of the media data, and analysing the call based on the media data and the further subscriber data.

The further subscriber data may be received from at least one of a location database (e.g., a SMLC) and an O/BSS. The (initial) subscriber data including the at least one subscriber identifier may be received from an MSC, a CSCF, a TSC, a wireline telecommunications exchange or any other control node.

Analysing the call may comprise performing media data analysis. The media data analysis, in turn, may comprise identifying individual content items in the media data and matching the identified content items with one or more predefined content items. As understood herein, the media data may take the form of audio (e.g., speech) data, text data, picture data, video data or any combination thereof. As such, the content items may take the form of words or pictures. In one variant, identification of the individual content items in the media data may comprise a media data-to-text conversion (e.g., a speech-to-text conversion). In such a case, the one or more predefined content items may be provided in the form of one or more keywords.

Analysing the call may also comprise analysing the further subscriber data. In this regard, the further subscriber data may be matched with one or more predefined subscriber criteria. The one or more predefined subscriber criteria may pertain to one or more of a current location of one or both of the first subscriber terminal and the second subscriber terminal, a home location of one or both of the first subscriber terminal and the second subscriber terminal, and personal information associated with the subscriber(s) of one or both of the first subscriber terminal and the second subscriber terminal. The personal information may relate to an age, a gender, or other information.

At least one association of one or more predefined content items and one or more predefined subscriber criteria may be provided. The at least one association may be provided in the form of an individual data set within a database. As will be appreciated, the database may comprise a large plurality of such datasets.

It may be determined for the call if the identified content items and the further subscriber data (e.g., fully or partially) match the predefined content items and predefined subscriber criteria of an individual association. A counter may be maintained for each association, that is incremented for each match. The counter may be maintained within a dedicated database or otherwise. The associations may be generated from user input received via a plurality of user interfaces (e.g., installed on separate user terminals). In a similar manner, the association counters or reports derived therefrom may be made available via the user interfaces. As will be appreciated, the association counters provide for an anonymisation of the call analysis results.

Also provided is a computer program product comprising program code portions for performing the steps for any of the methods and method aspects presented herein when the computer program product is executed on one or more computing devices. The computer program product may be stored on a computer-readable recording medium such as a CD-ROM, DVD, or semiconductor memory. The computer program product may also be provided for download via a network connection.

Also provided is device for processing in a telecommunications core network a call between at least a first subscriber terminal and a second subscriber terminal, wherein the call includes media data. The device is configured to verify that the call is allegible for call analysis. The device is further configured to trigger a first node on a call control plane of the core network to provide subscriber data to a call analysis node. The subscriber data includes at least one subscriber identifier for at least one of the first subscriber terminal and the second subscriber terminal. Furthermore, the device is configured to trigger a second node on a user plane of the core network to direct at least a part of the media data to the call analysis node.

The processing device may be configured to operate in of an MSC, a CSCF, a TSC and a wireline telecommunications exchange. The device could also be configured to operate in any other core network node. The device may generally be configured to perform any of the methods and method aspects discussed herein.

Further provided is a call analysis node for analysing a call between at least a first subscriber terminal and a second subscriber terminal, wherein the call includes media data. The call analysis node is configured to receive, on a call control plane, subscriber data. The subscriber data includes at least one subscriber identifier for at least one of a first user terminal and a second user terminal. The call analysis node is further configured to request, based on the at least one subscriber identifier, further subscriber data and to receive the further subscriber data. Further, the call analysis node is configured to receive, on a user plane, at least a part of the media data, and to analyse the call based on the media data and the further subscriber data.

The call analysis node may generally be configured to perform any of the method and method steps disclosed herein.

Also provided is a media analysis system comprising the processing device as well as the media analysis node. The media analysis node may for this purpose be provided with interfaces to the core network and other networks or network nodes, such as a BOSS.

BRIEF DESCRIPTION OF THE DRAWINGS

Further aspects, advantages and optional features of the present disclosure will become apparent from the following description of exemplary embodiments and the accompanying drawings. In the drawings.

FIG. 5 schematically illustrates an embodiment of aggregated content items and subscriber criteria for use in the media analysis system of FIG. 3;

FIG. 6 illustrates a schematic diagram of an inter-operator communication embodiment;

FIG. 7 is a schematic diagram illustrating inter-operator signalling in connection with the embodiment of FIG. 6.

DETAILED DESCRIPTION

In the following description of exemplary embodiments, for purposes of explanation and not limitation, specific details are set forth in order to provide a thorough understanding of the present disclosure. It will be apparent to one skilled in the art that the present disclosure may be practised in other embodiments that depart from these specific details. For example, while certain embodiments will be described in connection with speech-to-text processing, it will be appreciated that the technique presented herein could also be implemented in connection with, for example, media-to-picture processing. Moreover, while certain operational principles will be described with reference to exemplary core network nodes, it will be appreciated that the processing and signalling steps could also be implemented by other core network nodes. Still further, those skilled in the art will appreciate that the services, functions and steps explained herein may be implemented using software functioning in conjunction with a programmed processor, an Application Specific Integrated Circuit (ASIC), a Digital Signal Processor (DSP) or general purpose computer. It will also be appreciated that while the following embodiments will primarily be described with reference to methods and devices, the present disclosure may also be embodied in a computer program product as well as in a system comprising a processor and a memory coupled to the processor, wherein the memory is encoded with one or more programs that may perform the services, functions and steps as disclosed herein when executed on the processor.

Figure 1:
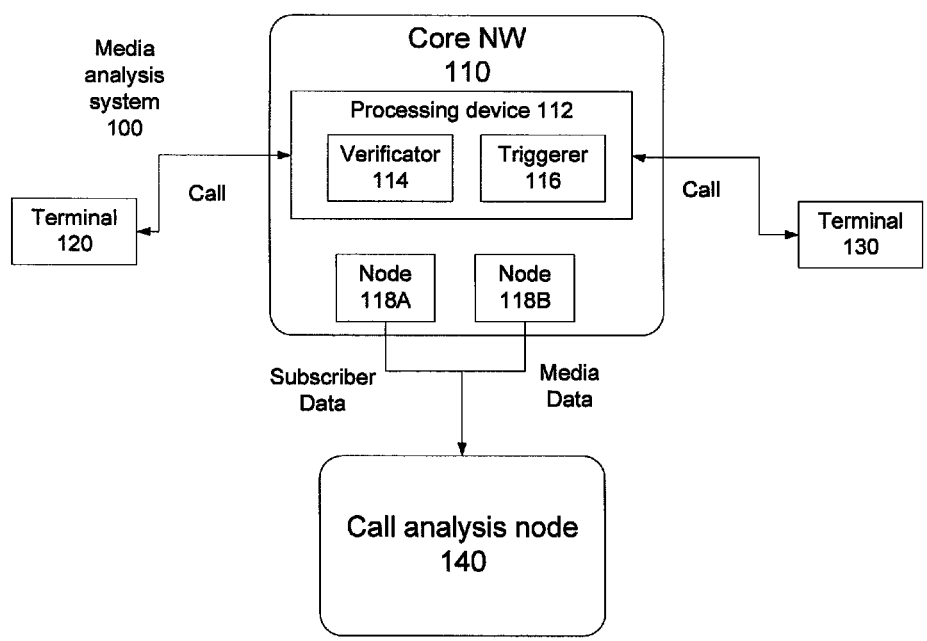
FIG. 1 shows a schematic embodiment of a media analysis system with a core network and a call analysis node.

FIG. 1 shows an embodiment of a media analysis system 100. As illustrated in FIG. 1, the system 100 comprises a telecommunications core network 110 configured to process a call between two or more subscriber terminals 120, 130. The system 100 further comprises a call analysis node 140 coupled to or integrated into the core network 110. The call analysis node 140 is configured to analyse the call between the two or more subscriber terminals 120, 130.

The call between the subscriber terminals 120, 130 may be a circuit-switched call, a packet-switched call or a combination thereof. In one variant, the call is a voice call, or at least comprises speech data. In another variant, the call is a multimedia call comprising various items of media data (e.g., speech data and video data). The multimedia call may be an OTT call (e.g., a Skype™ or Facetime™ call).

At least one of the subscriber terminals 120, 130 involved in the call may be a mobile terminal configured to attach to the core network 110 via a wireless (e.g., cellular or a non-cellular) or wireline access network. One or more of the subscriber terminals 120, 130 could also be configured as stationary terminals. In case of cellular network access, one or more of the terminals 120, 130 could be configured for communication in accordance with the Global System for Mobile communication, GSM, standard, the Universal Mobile Telecommunications System, UMTS, standard or the Long Term Evolution, LTE, standard.

It should be noted that the term "subscription" as used herein (e.g., in connection with the subscriber terminals 120, 130) may, but need not, relate to a subscription of wireless telecommunications services. As an example, one or more of the subscriber terminals 120, 130 also be associated with a conventional wireline subscription. What matters is that each subscriber terminal 120, 130 is associated with some kind of subscriber identifier, such as an ISDN number, an MSISDN number, an IMSI or an IP address which can be determined (e.g., looked-up, requested, assigned, etc.) by the core network 110.

Referring again to FIG. 1, the core network 110 comprises a processing device 112 with a verificator 114 and a triggerer 116. In one variant, the processing device 112 is configured with a processor (not shown) having access to a memory that stores program code which, when executed by the processor, causes the processor to operate as the verificator 114 and the triggerer 116.

Further, the core network 110 comprises one or multiple core network nodes 118A, 118B. It should be noted that the processing device 112 may be part of any of the core network nodes 118A, 118B, and that the two nodes core network nodes 118A, 118B illustrated in FIG. 1 could also be integrated into a single node.

In the exemplary realisation illustrated in FIG. 1, the core network node 118A is in charge of handling a call control plane of the core network 110, while the other core network node 118B is in charge of handling a user plane of the core network 100. The core network nodes 118A, 118B are configured to communicate with the call analysis node 140 (either directly or via the processing device 112) to provide subscriber data and media data to the core analysis node 140.

Figure 2:
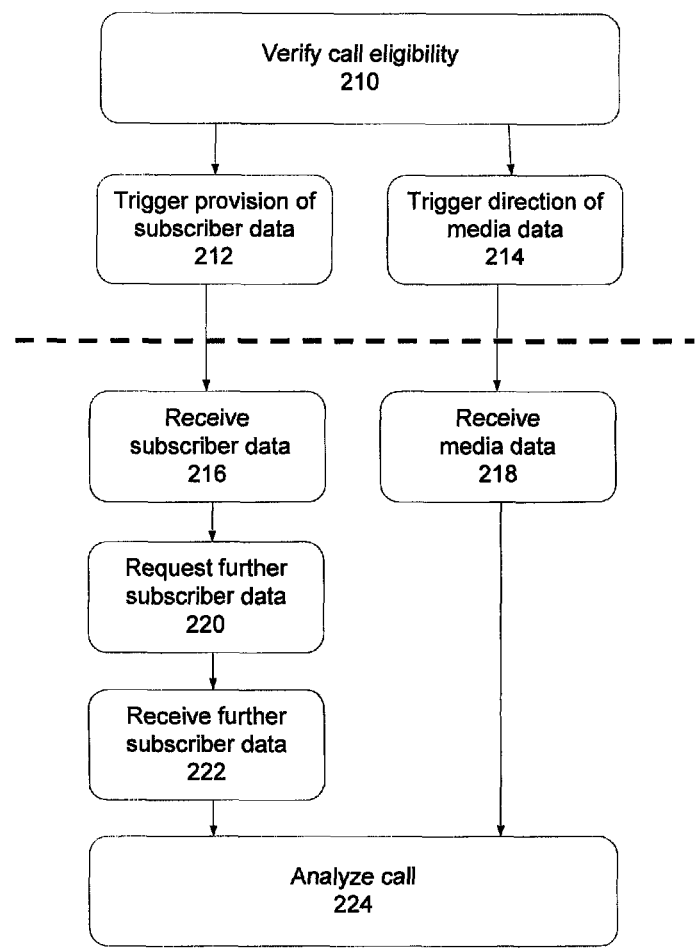
FIG. 2 shows a flow diagram of a method embodiment that illustrates the operational principles of the core network and the call analysis node of FIG. 1.

In the following, operational principles of the core network 110 and the call analysis node 140 will be described in more detail with reference to a method embodiment illustrated in the flow diagram of FIG. 2. In brief, the core network 110 performs call processing as illustrated in the upper half of FIG. 2, and the call analysis node 140 performs call analysis as shown in the lower half of FIG. 2.

In an initial step 210, the verificator 114 of the processing device 112 within the core network 110 verifies that the call stretching between the subscriber terminal 120 and the subscriber terminal 130 is eligible for call analysis. In this regard, the verificator 114 may determine that at least one of the subscriber terminals 120, 130 is associated with a call analysis consent setting. The call analysis consent setting indicates an individual subscriber's consent to call analysis.

The corresponding call analysis consent setting information underlying step 210 may be locally provided within the core network 110 or, alternatively, be received from an O/BSS (not illustrated in FIG. 1).

In a further step 212, the triggerer 116 of the processing device 112 triggers the core network node 118A on the control plane to provide subscriber data to the call analysis node 140. The subscriber data includes at least one subscriber identifier for at least one of the subscriber terminals 120, 130. As an example, one or more of an ISDN number, an MSISDN number, an IMSI and an IP address may be provided for an individual subscriber terminal 120, 130 to the call analysis node 140. In case one of the subscriber terminals 120, 130 is not associated with a call analysis consent setting, the corresponding subscriber identifier may be excluded from being provided to the call analysis node 140.

In a further step 214 (that may be performed in any temporal order relative to step 212), the triggerer 116 triggers the core network node 118B on the user plane to direct at least a part of the media data to the call analysis node 140. In case all subscriber terminals 120, 130 involved in a call are associated with a call analysis consent setting, the full media data may be directed by the core network node 118B to the call analysis node 140. Otherwise, if one of the subscriber terminals 120, 130 is not associated with a call analysis consent setting, the media data originating from the respective subscriber terminal 120, 130 may be excluded from being directed to the call analysis node 140. Alternatively, the full media data may be directed to the call analysis node 140, but the call analysis node 140 is instructed to exclude media data originating from the respective subscriber terminal 120, 130 from media data analysis.

The call analysis node 140 receives, in step 216, the subscriber data (that includes at least one subscriber identifier for at least one of the subscriber terminals 120, 130) and, in step 218, at least a part of the media data. The subscriber data may be received on a call control plane, and the media data may be received on a user plane. For this purpose, the call analysis node 140 may have a dedicated call control plane interface as well as a dedicated user plane interface towards one or more nodes in the core network 110.

In step 220, the call analysis node 140 requests further subscriber data. The corresponding request may be directed to the core network 110 or an O/BSS (not shown in FIG. 1) and may include a reference to the subscriber identifier (as received in step 216) for which the further subscriber data are requested. The requested further subscriber data are received in step 222. Then, in step 224, the call is analysed by the call analysis node 140 based on the media data received in step 218 and the further subscriber data received in step 222. The further subscriber data received in step 222 and analysed in step 224 may include location data for at least one of the subscriber terminals 120, 130. Additionally, or as an alternative, the further subscriber data may include personal information pertaining to an individual subscriber (e.g., age or gender information).

In the following, the architectural and operational principles discussed above with reference to FIGS. 1 and 2 will be described in more detail with reference to the media analysis system 100 illustrated in FIGS. 3 and 4. The same reference numerals as used in connection with FIG. 1 denote identical or similar components in FIGS. 3 and 4.

Figure 3:
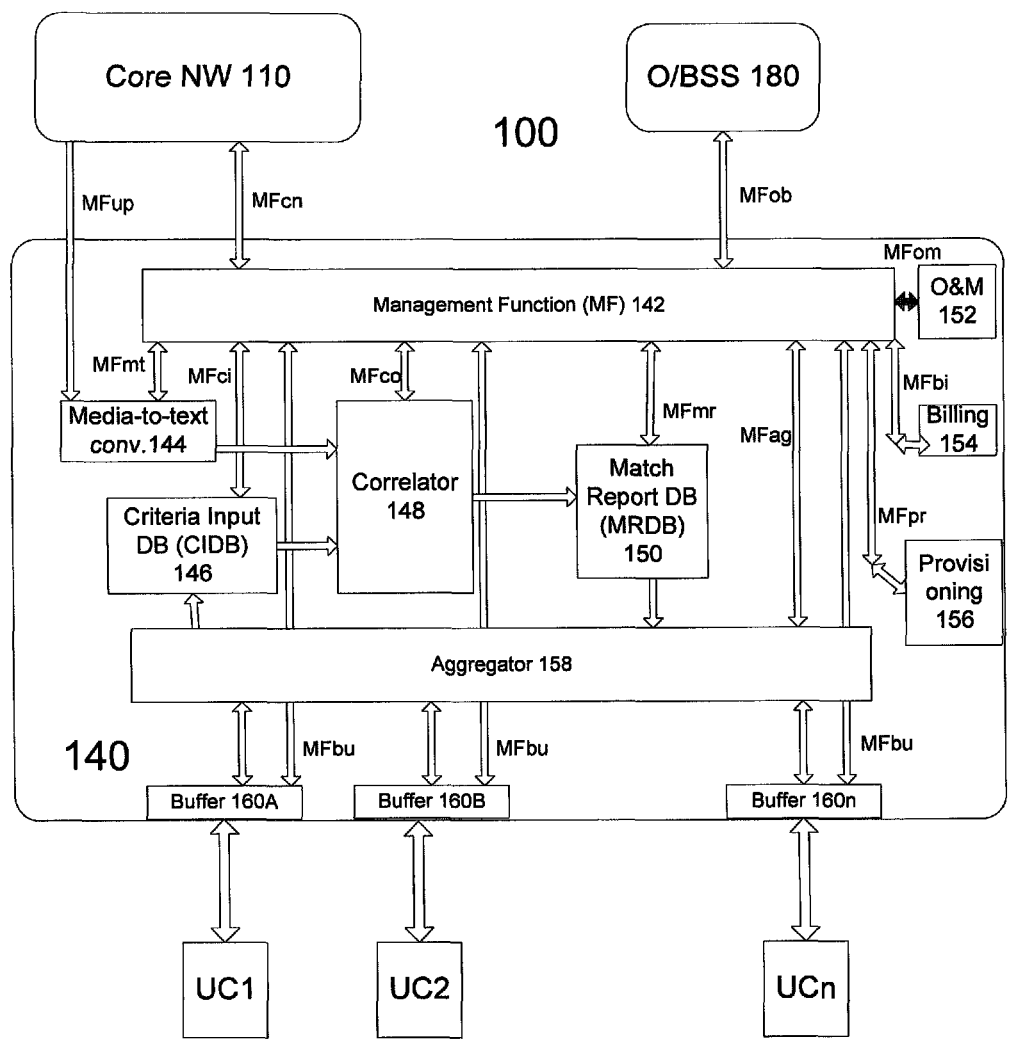
FIG. 3 shows a more detailed implementation of an embodiment of a media analysis system.

FIG. 3 illustrates some of the components constituting the call analysis node 140 as well as internal interfaces of the call analysis node 140 and interfaces of the call analysis node 140 to the "outside world". FIG. 4 illustrates some of the components constituting the core network 110 as well as the signalling within the media analysis system 100.

With reference to FIG. 3, the call analysis node 140 is configured for control plane and user plane communication with the core network 110, and for signalling with an O/BSS 180 and with multiple user clients UC1, UC2, . . . UCn. This communication and signalling is mainly coordinated by a Management Function, MF, 142 in the call analysis node 140.

The MF 142 has a dedicated interface MFcn to the core network 110 and a dedicated interface MFob to the O/BSS 180. Further, the MF 142 has a plurality of dedicated interfaces MFbu to local buffers 160A, 160B . . . 160$n$ associated with the individual user clients UC1, UC2, . . . UCn.

The buffers, in the following jointly designated by reference numeral 160, are configured to store input data received from the user clients, in the following jointly denoted as UC. The user clients UC are configured to upload content items and associated subscriber criteria in the buffers 160, which will be analysed in connection with call analysis by the call analysis node 140. The buffers 160 may be configured to prevent non-authorized access (e.g., via an authentication or firewall function towards the user clients UC).

Via the interface MFbu, the MF 142 can set the functionality of each individual buffer 160 with respect to the content items and subscriber criteria that can be uploaded by the user clients UC. As an example, the maximum numbers of content items and/or subscriber criteria that can be uploaded by the user clients UC could be set by the MF 142.

The MF 142 also has a dedicated interface MFmt to a converter 144 of the call analysis node 140. In the present embodiment, the converter 144 is configured as a media-to-text converter (e.g., using speech analysis functionalities).

The media-to-text converter 144 has a dedicated interface MFup to the core network 110. Via the interface MFup, media data (e.g., in the form of one or more media streams) on a user plane within the core network 110 are received by the converter 144. The converter 144 may receive, via the interface MFup, media data pertaining to a large number of calls at the same time.

The converter 144 in the present embodiment extracts text from the received media data. To this end, speech data or any other data that can be represented in the form of text are identified (e.g., stripped from a multimedia call) and then converted into text (e.g., into individual words). The conversion is controlled via the interface MFmt by the MF 142. As an example, the MF 142 may set and, optionally, adjust speech analysis parameters underlying the operation of the converter 144.

As shown in FIG. 3, the MF 142 has a further dedicated interface MFci to a database 146. The interface MFci permits a setting and control of database functionalities by the MF 142. The database 146 will in the following also be called criteria input database, or CIDB.

The CIDB 146 stores aggregations of content items and subscriber criteria uploaded by the user clients UC in the buffers 160. Given the nature of the media-to-text converter 144, in the present embodiment the aggregated content items in the CIDB 146 take the form of aggregated textual inputs such as keywords. The CIDB 146 further stores the subscriber criteria associated with the content items in the buffers 160. Also the subscriber criteria may, if needed, be aggregated. The aggregation is performed by an aggregator 158. The aggregator 158 is configured to load the aggregated textual inputs as well as the aggregated subscriber criteria in the CIDB 146.

FIG. 5 illustrates an embodiment of a data structure representative of the user inputs in the buffers 160 as aggregated by the aggregator 158. As shown in FIG. 5, the aggregator 158 associates (e.g., in individual data sets) the predefined content items as well as the predefined subscriber criteria as read by the aggregator 158 from the buffers 160. It should be noted that the data sets resulting from the aggregation can associate, or correlate, for each user client UC one or more predefined content items with one or more predefined subscriber criteria. For each user client UC, one or multiple such aggregations may be determined by the aggregator 158. The operation of the aggregator 158 is controlled by the MF 142 via a dedicated interface MFag (see FIG. 3).

The aggregated inputs are then uploaded by the aggregator 148 in the CIDB 146. An example for the resulting structure of the CIDB 146 is visualized in the following table:

| CIDB structure | UC1 | | | UC2 | | | UC n | | |
|---|---|---|---|---|---|---|---|---|---|
| | Crit1 | Crit2 ... | Critp | Crit1 | Crit2 ... | Critp | ... Crit1 | Crit2 ... | Critp |
| Text 1 | | | | | | | | | |
| Text 2 | | | | | | | | | |
| ... | | | | | | | | | |
| Text z | | | | | | | | | |

The above structure of the CIDB 146 could also be expressed as individual associations (e.g., in the form of data sets), wherein each association associates one or more content items such as textual inputs ($z \geq 1$) and one or more subscriber criteria ($p \geq 1$) for an individual user client UC. It will be appreciated that for each user client UC one or multiple associations may be defined. Each association may be provided with a unique identifier, such as "Association 1", and so on.

The subscriber criteria included in the CIDB 146 may be evaluated by the MF 142, via the interface MFci, to determine the subscriber data to be collected from the core network 110 (via the interface MFcn) and/or O/BSS 180 (via the interface MFob) for analysis puroposes.

As illustrated in FIG. 3, the MF 142 further comprises a dedicated interface MFco to a correlator 148. The interface MFco permits a setting and, optionally, control of the correllator 148 via the MF 142. Also, the interface MFco permits the forwarding of subscriber data as collected by the MF 142 from one or both of the call network 110 and the O/BSS 180 to the correlator 148. The correlator 148 receives, in the present embodiment, textual input from the converter 144. Further, the correlator 148 has access to the CIDB 146 for reading the individual associations between content items (e.g., predefined keywords) and predefined subscriber criteria as expressed in the above table.

The correlator 148 is configured to correlate the content items (i.e., words) identified by the converter 144 within the media data of an individual call and the subscriber data associated with the call on the one hand with the associations defined in the CIDB 146 on the other hand. In this context, the correlator 148 attempts to match the content items and subscriber data underlying the particular call with the individual associations defined in the CIDB 146. To this end, the content items underlying the call may be temporarily buffered (i.e., for a certain period of time during the call or for a full call) and may at the end of each buffering period be matched against the associations in the CIDB 146.

For each partial or full match, a match report database, or MRDB, 150 is updated by the correlator 148. It should be noted that the MRDB 150 could be integrated in the CIDB 146.

There are various possibilities for updating the MRDB 150 by the correlator 148 in response to a partial or full match. As an example, the MRDB 150 may comprise one or more counters for individual ones of the predefined content items (e.g., textual inputs such as keywords in the present embodiment) or for individual associations contained in the CIDB 146. An example of a structure of the MRDB 150 is illustrated in the table below:

| MRDB structure | # of all criteria and text met | # of all criteria met except the text | Total # of calls for given criteria | Total # of calls in the NW | %1 | %2 | ... | % m |
|---|---|---|---|---|---|---|---|---|
| Association 1 | | | | | | | | |
| Association 2 | | | | | | | | |
| ... | | | | | | | | |
| Association n | | | | | | | | |

As shown in the above example, a separate counter may be maintained for each association, that will be incremented for a full match (in terms of predefined content items and predefined subscriber criteria) found by the correlator 148. Also, a counter may be provided for the calls in which only the subscriber criteria underlying an individual association can be matched, but not the text. Still further, the total number of calls for the predefined subscriber criteria (e.g., as underlying an individual association) may be counted. The total number of calls handled by the core network 110 may be counted as well. Finally, percentages may be calculated based on the counters, such as the percentage of full matches relative to the total number of calls in the core network 110, and so on.

As shown in FIG. 3, the MF 142 has a dedicated interface MFmr to the MRDB 150. The interface MFmr may be used to set, and optionally control, one or more aspects of the MRDB 150. As an example, the MF 142 may start new counting cycles after elapse of a predefined period of time via the interface MFmr.

The MRDB 150 is further coupled to the aggregator 158. The aggregator 150 may generate reports from the MRDB 150 (e.g., in predefined cycles) and forward the reports to the associated buffers 160. As will appreciated, the report uploaded by the aggregator 158 in an individual buffer 160 will correspond to the user input (e.g., association of one or more predefined content items and one or more predefined subscriber criteria) previously defined via the associated user client UC in the buffer 160. The report generation functionality of the aggregator 158 may be controlled by the MF 142 via the interface MFag.

As also shown in FIG. 3, the call analysis node 140 further comprises an Operation and Maintenance (O & M) function 152, a billing function 154 and a provisioning function 156 with associated interfaces MFom, MFbi and MFpr, respectively, to the MF 142. The O & M function 152 permits a setup and control of the call analysis node 140 and, in particular, of the MF 142. The billing function 154 permits a billing towards the user clients UC as well as accounting-related operations towards other nodes within the core network 110 and/or the O/BSS 180. Finally, the provisioning function 156 permits the handling of security aspects, the maintenance (e.g., setup, deletion, etc.) of the buffers 160 as well as access-related functions with respect to the user clients UC.

In the following, the operation of the components illustrated in FIG. 3 will be described in more detail with reference to the signalling diagram of FIG. 4. The signalling between the call analysis node 140 on the one hand and the core network 110 and/or the O/BSS 180 on the other hand may be based on Session Initiation Protocol, SIP, signalling. Moreover, FIG. 4 also shows some internal components of the core network 110 and the O/BSS 180.

Figure 4:
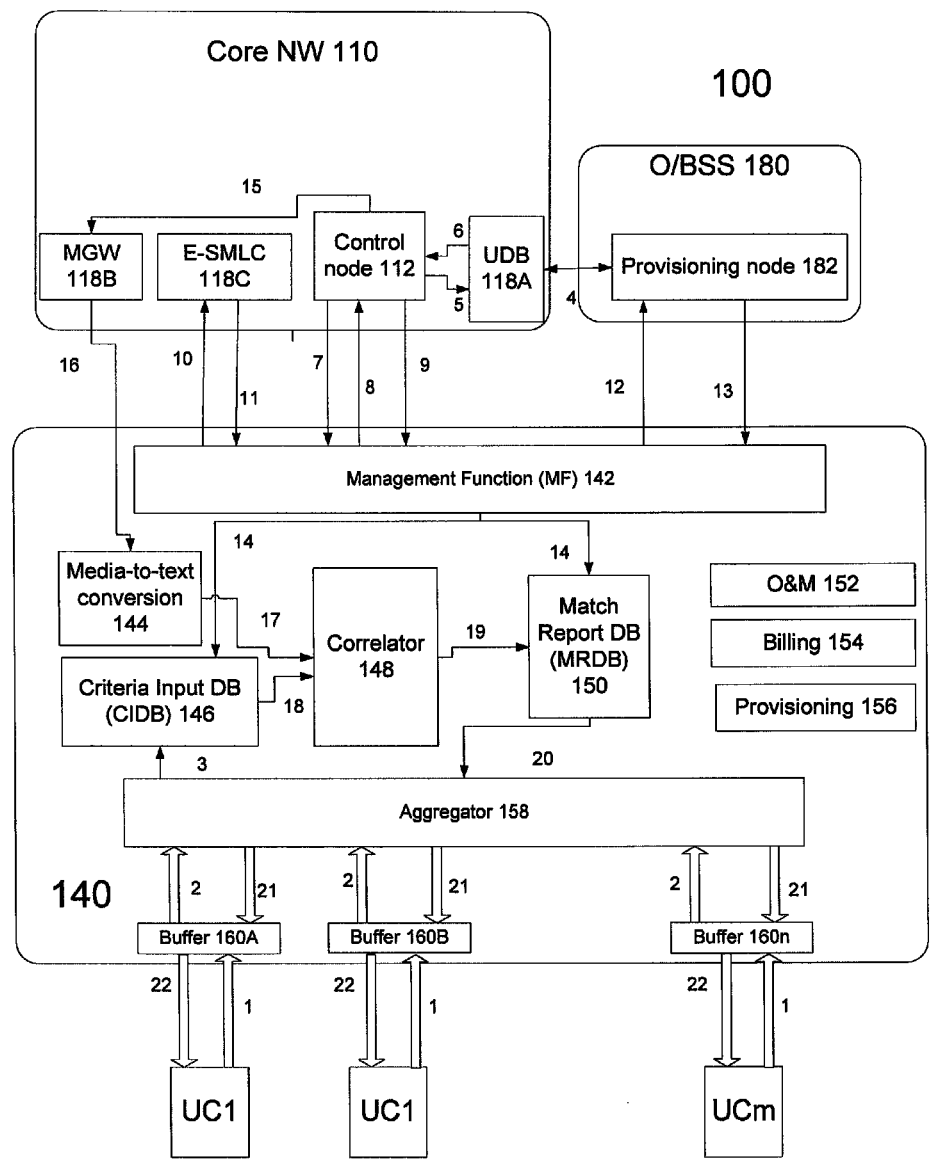
FIG. 4 is a schematic diagram illustrating a signalling embodiment within the media analysis system of FIG. 3.

As depicted in FIG. 4, the core network 110 comprises a central control node 112 that provides the functionalities of the processing device discussed above with reference to FIG. 1. As an example, the control node 112 could be realized as an MSC, a CSCF, an TSC or a wireline telecommunications exchange. A database 118A with subscriber information is also present in the core network 110. This database 118A may be realized in the form of an HLR or a UDB. As shown in FIG. 4, the database 118A with subscriber information may be coupled to a provisioning node 182 in the O/BSS 180. The provisioning node 82 can be configured to upload subscriber data in the database 118A. Further, the core network 110 comprises a gateway node 118B that is configured to direct at least a part of the media data of a particular call to the call analysis node 140. The network node 118B can be realized as any gateway node, such as an MGW or an EGW Furthermore, an enhanced SMLC (E-SMLC) 118C or any other location database is provided in the core network 110.

In the following, various signalling steps between the components illustrated in FIG. 4 will be described in more detail. The signalling steps are numbered in order to permit the easy identification in FIG. 4. It will be appreciated that the numbering does not necessarily define any temporal order of the signalling steps (except for dedicated request/ response signalling procedures).

The operation of the data analysis system 100 of FIG. 3 starts in a first step with the user clients UC uploading associations of one or more (user-defined) content items and one or more (user-defined) subscriber criteria to the buffers 160. As explained above, the content items may be defined in the form of keywords, such as "soccer" or "car". The subscriber criteria may defined in terms of a particular gender, a particular age group (e.g., from 18 to 45) or in the form of location criteria (e.g., within Stockholm).

The individual associations uploaded by the user clients UC in the buffers 160 are authenticated and then forwarded in a second step to the aggregator 158. The aggregator 158 aggregates the individual associations as explained above and then, in a third step, updates the CIDB 146 accordingly.

Independently from the operation of the user clients UC and the aggregator 158, the provisioning node 182 in the O/BSS 180 checks within a local O/BSS database (not shown in FIG. 4) for an individual subscriber dataset if the subscriber dataset is associated with a call analysis consent setting. A call analysis consent may, for example, be the result of an agreement between an individual subscriber and an operator, that is reflected in the O/BSS database. If no such an agreement is in place, there will be no call analysis consent setting for the particular subscriber.

In one example, the call analysis consent setting may take the form of a flag that has been set, wherein as a default the flag remains non-set. For particular subscriber profiles (e.g., for VIP subscribers) there may mandatorily be no call analysis consent setting, whereas for other subscriber profiles the call analysis consent setting can selectively be enabled and disabled (e.g., the flag may be set or reset).

The provisioning node 182 is configured to upload in a fourth step call analysis consent setting information into the database 118A within the core network 110. Such an upload may be performed for individual subscribers (e.g., on a call-by-call basis) upon request by the core network 110, or batch-wise for large set of a subscribers.

The control node 112 is configured to request in a fifth signalling step subscriber data from the database 118A. The subscriber data may, for example, be requested during call setup and/or location update with respect to an individual call or an individual subscriber terminal 120, 130. The corresponding subscriber data are provided in a sixth step by the database 118A to the control node 112. The subscriber data may include the subscriber identifier of a particular subscriber terminal 120, 130 together with the call analysis consent setting, if available.

The control node 112 then checks (e.g., during call setup) individually for the originating subscriber terminal 120 and the terminating subscriber terminal 130 whether the call is eligible for call analysis. Specifically, the control node 112 verifies that the call is eligible for call analysis by determining that at least one of the subscriber terminals 120, 130 involved in the call is associated with a call analysis consent setting. As will be appreciated, the control node 112 may determine the call analysis consent setting for all the subscriber terminals 120, 130 involved in the call only when all subscriber terminals 120, 130 are neither roaming in nor visiting the core network 110. Otherwise, if it is determined that the call network 110 is not the home network of at least one of the subscriber terminals 120, 130 involved in the call, the control node 112 will need to request call analysis consent setting information for the respective subscriber terminal 120, 130.

As an example, the control node 112 may request call analysis consent setting information for a roaming or visiting subscriber terminal 120, 130 from either its home network directly or via the call analysis node 140. The core networks 110 (and call analysis nodes 140) of multiple operators can be coupled as illustrated in FIG. 6 for exchange of call analysis consent setting information pertaining to roaming or visiting subscriber terminals 120, 130. It should be noted with respect to FIG. 6 that not only subscriber data in the form of call analysis consent setting information may be exchanged, but also further subscriber data including personal information such as age, gender, and so on.

The signalling between two core networks of different operators X and Y for the exchange of call analysis consent setting information and, optionally, further subscriber data is illustrated in FIG. 7. Initially, a request message including the number of the roaming or visiting subscriber terminal 120, 130 is sent from a network node of operator X to a network node of operator Y. The network node of operator Y then replies, in case the request is granted, with the call analysis consent setting information for the corresponding roaming or visiting subscriber, or, in the alternative, rejects the request.

In a seventh signalling step illustrated in FIG. 4, the control node 112 informs the MF 142 of a particular call that is at least partially (i.e., with respect to at least one subscriber terminal 120, 130) eligible for call analysis. In the seventh signalling step, the control node 112 may also inform the call analysis node 140 of one or more subscriber numbers underlying the call. The subscriber numbers are received from the database 118A or otherwise (see FIGS. 6 and 7), and are forwarded by the control node 112 to the MF 142. Additionally, call analysis consent setting information may be transmitted in the seventh signalling step, or in another signalling step, by the control node 112 to the MF 142. Furthermore, if one or more subscriber terminals 120, 130 involved in the call are not associated with a call analysis consent setting, the control node 112 may then also inform the MF 142 that the media data originating from the respective subscriber terminal 120, 130 is to be excluded from the media analysis.

In an eighth signalling step, the MF 142 may optionally request further subscriber data from the control node 112. As an example, the MF 142 may request a subscriber identifier in case it has not yet been sent earlier by the control node 112. Also, in case the call analysis node 140 has performed the acquisition of call analysis consent setting information for a roaming or visiting subscriber terminal 120, 130 via the scenario of FIG. 6, corresponding call analysis consent setting information may be forwarded to the control node 112 in the eighth signalling step. Then, in a ninth signalling step, the control node 112 forwards possibly missing information or subscriber data to the MF 142.

In an optional step 10, the MF 142 requests location data from the core network 110 for one or more of the subscriber terminals 120, 130 involved in the call. As shown in FIG. 4, the location information may be requested from the E-SMLC 118C or any other location database. Signalling step 10 may be performed responsive to an analysis of the subscriber criteria defined in the CIDB 146 by the MF 142. As will be appreciated, signalling step 10 can be omitted in case the associations the CIDB 146 do not define a location criterion. The core network 110 provides the requested location data in signalling step 11 to the call analysis node 140.

Then, in signalling step 12, the MF 142 requests further subscriber data from the provisioning node 182 of the O/BSS 180. The request transmitted in this regard will comprise the subscriber identifier for which the further subscriber data is requested. The request may also comprise an indication of the particular further subscriber data of interest (i.e., as determined by the MF 142 from CIDB 146). The requested further subscriber data is provided by the provisioning node 182 in signalling step 13.

Then, in signalling step 14, the subscriber data collected by the MF 142 (from the core network 110 and/or the O/BSS 180) will be forwarded to the CIDB 146 and the MRDB 150 as needed.

In signalling step 15, the control node 112 triggers the gateway node 118B to direct the media data underlying the call between the subscriber terminals 120, 130 to the call analysis node 140. In case one of the subscriber terminals 120, 130 is not associated with a call analysis consent setting, the gateway node 118B may be instructed to exclude media data originating from the respective subscriber terminal 120, 130 from being forwarded to the call analysis 140 (step 16).

At the call analysis node 140, the media data from the gateway node 118B is received by the media-to-text converter 144. The converter 144 translates the received media data into text and sends the translated text (e.g., in the form of identified words) to the correlator 148 in signalling step 17. The correlator 148, in signalling step 18, also receives the content of the CIDB 146 and checks if there is a match between identified words and received subscriber data on the one hand and individual associations within CIDB 146 on the other hand. An exemplary structure of the CIDB 146 and exemplary associations have already been discussed above.

When the call has ended, the core network 110 will inform the MF 142 thereof and the MF 142 will control the corellator 148 and the MRDB 150 accordingly. Then, in signalling step 19, the correlator 148 updates the MRDB 150 in accordance with the correlation results.

The aggregator 158 or the MRDB 150 may be provided with a scheduler that collects counters and other information from the MRDB 150 in regular intervals. As will be appreciated, the information in the MRDB 150 is anonymized since it will not include any subscriber identifier or similar information that allows a conclusion in relation of the involved subscriber. Rather, only counting results are provided in the MRDB 150.

The information retrieved by the aggregator 158 in step 20 is formatted into individual, user client-specific reports and then uploaded in the respective buffer 160 in step 21. In step 22, the user clients UC retrieve those reports from the buffers 160. The reports may be adjusted based on a user-selected level of granularity (e.g., per hour, per day, per week, . . . ).

As has become apparent from the above exemplary embodiment, the call analysis node 140 will essentially operate on the basis of anonymized data. In particular, the data stored in the MRDB 150 will not reveal any subscriber-specific information (like IMSI, ISDN number, MSISDN number, IP address, and so on). While a subscriber identifier will be provided by the core network 110 to the MF 142 for the purpose of retrieving subscriber data from the provisioning node 182, the subscriber identifier, and any other privacy-related data, will be erased from the call analysis node 140 at the end of the call.

Figure 8:
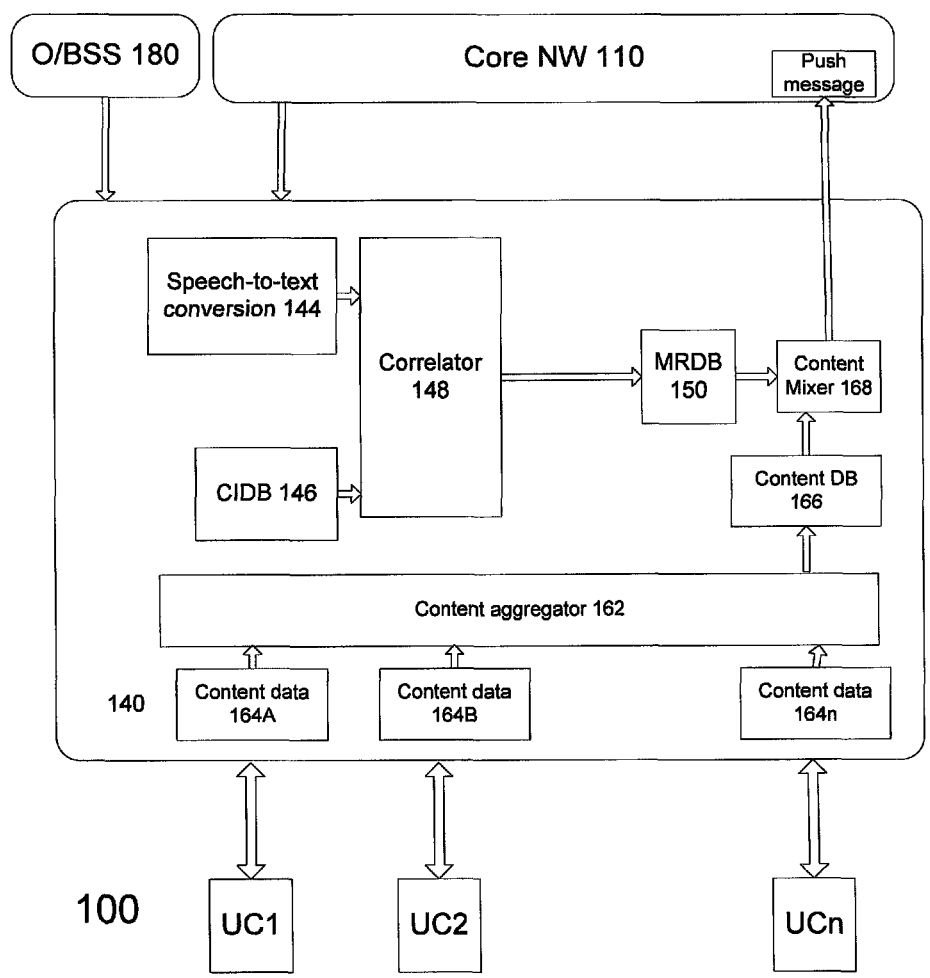
FIG. 8 is a schematic diagram of the media analysis system of FIG. 3 with additional content processing facilities.

The embodiments discussed above may be extended as shown in FIG. 8. Specifically, the user clients UC may upload content data 164 for the subscriber terminals 120, 130 in the buffers 160. The aggregator 158, or a dedicated content aggregator 162, aggregates the content data 164 in a content database 166. A content mixer 156 is configured to correlate the content of the MRDB 150 with the content database 166 to select content to be transferred, for example via a push-messaging service, to the subscriber terminals 120, 130. As an example, for each full match of an individual association in the CIDB 164, a particular set of content data 164 in the content database 166 may be identified and transferred to one or more of the subscriber terminals 120, 130 for which the match was found in a particular call. As such, there may be a link between an individual association and an individual item of content data 164. The content message may be transmitted to the associated subscriber terminals 120, 130 either during the call or thereafter.

The content data in the content database 166 may be information dedicated to individual subscriber terminals 120, 130. As an example, the data may relate to location-based services and/or advertisements.

It is believed that many advantages of the present disclosure will be fully understood from the foregoing description, and it will be apparent that various changes may be made in the form, construction and arrangement of the exemplary aspects thereof without departing from the scope of the invention, or without sacrificing all of its advantages. Because the invention can be varied in many ways, it will be recognized that the invention should only be limited by the claims that follow.

The invention claimed is:

1. A method of processing in a telecommunications core network a call between at least a first subscriber terminal and a second subscriber terminal, wherein the call includes media data, the method comprising:
   verifying that the call is eligible for call analysis;
   determining that one of the first subscriber terminal and the second subscriber terminal is not associated with a call analysis consent setting;
   triggering a first node on a call control plane of the core network to provide subscriber data to a call analysis node, wherein the subscriber data includes at least one subscriber identifier for at least one of the first subscriber terminal and the second subscriber terminal;
   triggering a second node on a user plane of the core network to direct at least a part of the media data to the call analysis node; and
   excluding media data originating from the one of the first subscriber terminal and the second subscriber terminal that is not associated with the call analysis consent setting from being directed to the call analysis node or informing the call analysis node that media data originating from the one of the first subscriber terminal and the second subscriber terminal that is not associated with the call analysis consent setting is to be excluded from media analysis.

2. The method of claim 1, wherein
   verifying that the call is eligible for call analysis comprises determining that at least one of the first subscriber terminal and the second subscriber terminal is associated with a call analysis consent setting.

3. The method of claim 2, further comprising
   receiving call analysis consent setting information for at least one of the first subscriber terminal and the second subscriber terminal from an Operator or Business Support System (O/BSS).

4. The method of claim 2, further comprising:
   determining that at least one of the first subscriber terminal and the second subscriber terminal is roaming in or visiting the core network; and
   requesting call analysis consent setting information for the roaming or visiting subscriber terminal(s) from at least one of the call analysis node and a home network.

5. The method of claim 1, further comprising:
   receiving, from the call analysis node, a request for location data of at least one of the first subscriber terminal and the second subscriber terminal; and
   triggering provision of the requested location data to the call analysis node.

6. A method of operating a call analysis node for analyzing a call between at least a first subscriber terminal and a second subscriber terminal, wherein the call includes media data, the method comprising:
   receiving, on a call control plane, subscriber data, the subscriber data including at least one subscriber identifier for at least one of the first subscriber terminal and the second subscriber terminal;
   receiving information that media data originating from one of the first subscriber terminal and the second subscriber terminal that is not associated with a call analysis consent setting is to be excluded from call analysis;
   requesting, based on the at least subscriber identifier, further subscriber data;
   receiving the further subscriber data;
   receiving, on a user plane, at least a part of the media data; and
   analyzing the call based on the media data and the further subscriber data, wherein analyzing the call based on the media data and the further subscriber data comprises excluding media data originating from the one of the first subscriber terminal and the second subscriber terminal that is not associated with the call analysis consent setting from being analyzed.

7. The method of claim 6, wherein
   the further subscriber data are received from at least one of a location database and an Operator or Business Support System (O/BSS).

8. The method of claim 6, wherein
   analyzing the call comprises performing media data analysis.

9. The method of claim 8, wherein
   the media data analysis comprises identifying individual content items in the media data and matching the identified content items with one or more predefined content items.

10. The method of claim 9, wherein
    identifying the individual content items comprises a media data-to-text conversion.

11. The method of claim 9, wherein
    the one or more predefined content items are provided in the form of one or more keywords.

12. The method of claim 9, further comprising:
    providing at least one association of one or more predefined content items and one or more predefined subscriber criteria.

13. The method of claim 12, wherein
    the at least one association is provided in the form of an individual dataset within a database.

14. The method of claim 12, further comprising:
    determining, for the call, if the identified content items and the further subscriber data at least partially match the predefined content items and predefined subscriber criteria of an individual association.

15. The method of claim 14, further comprising:
    maintaining a counter for each association; and
    incrementing the counter for each match.

16. The method of claim 9, further comprising:
    generating the associations from user input received via a plurality of user interfaces.

17. The method of claim 6, wherein
    analyzing the call comprises analyzing the further subscriber data.

18. The method of claim 17, wherein
analyzing the further subscriber data comprises matching the further subscriber data with one or more predefined subscriber criteria.

19. The method of claim 18, wherein
the one or more predefined subscriber criteria pertain to one or more of a current location of one or both of the first subscriber terminal and the second subscriber terminal, a home location of one or both of the first subscriber terminal and the second subscriber terminal, and personal information associated with the subscriber(s) of one or both of the first subscriber terminal and the second subscriber terminal.

20. A device for processing in a telecommunications core network a call between at least a first subscriber terminal and a second subscriber terminal, wherein the call includes media data, the device being configured to:
verify that the call is eligible for call analysis;
determine that one of the first subscriber terminal and the second subscriber terminal is not associated with a call analysis consent setting;
trigger a first node on a call control plane of the core network to provide subscriber data to a call analysis node, wherein the subscriber data includes at least one subscriber identifier for at least one of the first subscriber terminal and the second subscriber terminal;
trigger a second node on a user plane of the core network to direct at least a part of the media data to the call analysis node; and
exclude media data originating from the respective subscriber terminal from being directed to the call analysis node or inform the call analysis node that media data originating from the respective subscriber terminal is to be excluded from media analysis.

21. A call analysis node for analyzing a call between at least a first subscriber terminal and a second subscriber terminal, wherein the call includes media data, the call analysis node being configured to:
receive, on a call control plane, subscriber data, the subscriber data including at least one subscriber identifier for at least one of the first subscriber terminal and the second subscriber terminal;
receive information that media data originating from one of the first subscriber terminal and the second subscriber terminal that is not associated with a call analysis consent setting is to be excluded from call analysis;
request, based on the at least subscriber identifier, further subscriber data;
receive the further subscriber data;
receive, on a user plane, at least a part of the media data; and
analyze the call based on the media data and the further subscriber data, wherein analyzing the call based on the media data and the further subscriber data comprises excluding media data originating from the one of the first subscriber terminal and the second subscriber terminal that is not associated with the call analysis consent setting from being analyzed.

* * * * *